(12) United States Patent
Velhal et al.

(10) Patent No.: US 7,493,477 B2
(45) Date of Patent: Feb. 17, 2009

(54) METHOD AND APPARATUS FOR DISABLING A PROCESSOR CORE BASED ON A NUMBER OF EXECUTIONS OF AN APPLICATION EXCEEDING A THRESHOLD

(75) Inventors: Ravindra V. Velhal, Beaverton, OR (US); Padmashree K. Apparao, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 52 days.

(21) Appl. No.: 11/479,592

(22) Filed: Jun. 30, 2006

(65) Prior Publication Data

US 2008/0005539 A1    Jan. 3, 2008

(51) Int. Cl.
*G06F 9/00* (2006.01)
*G06F 11/00* (2006.01)

(52) U.S. Cl. .............................. 712/220; 714/1; 714/47; 718/102

(58) Field of Classification Search ...................... 714/1, 714/13, 25, 30, 48, 100, 47; 712/10, 28, 712/244, 220; 718/104, 102, 220
See application file for complete search history.

(56) References Cited

U.S. PATENT DOCUMENTS

| | | | | | |
|---|---|---|---|---|---|
| 3,603,934 | A | * | 9/1971 | Heath et al. | 714/2 |
| 5,491,788 | A | * | 2/1996 | Cepulis et al. | 714/13 |
| 6,138,247 | A | * | 10/2000 | McKay et al. | 714/10 |
| 2005/0172164 | A1 | * | 8/2005 | Fox et al. | 714/13 |
| 2006/0036889 | A1 | * | 2/2006 | Arai | 714/1 |
| 2006/0184939 | A1 | * | 8/2006 | Sahoo et al. | 718/100 |
| 2006/0230307 | A1 | * | 10/2006 | Barlow et al. | 714/11 |

* cited by examiner

*Primary Examiner*—David J Huisman
(74) *Attorney, Agent, or Firm*—Buckley, Maschoff & Talwalkar LLC

(57) ABSTRACT

A system includes a multi-core processor including a first processor core and a second processor core, and a core manager. The core manager is to receive data during an execution of an application by the first processor core, the data indicating a potential fault associated with the first processor core, determine to disable the first processor core based on the data, and activate the second processor core to execute the application.

16 Claims, 5 Drawing Sheets

200

```
┌─────────────────────────────────────────────┐
│ Receive data during execution of an         │
│ application by a first processor core, the  │
│ data indicating a potential fault           │
│ associated with the first processor core    │
│                                         201 │
└─────────────────────────────────────────────┘
                      │
                      ▼
┌─────────────────────────────────────────────┐
│                                             │
│  Determine to disable the first processor   │
│                   core                      │
│                                         202 │
└─────────────────────────────────────────────┘
                      │
                      ▼
┌─────────────────────────────────────────────┐
│                                             │
│  Activate a second processor core to        │
│         execute the application             │
│                                         203 │
└─────────────────────────────────────────────┘
```

FIG. 2

|  | Reliability Rank | Active (Y/N) | Number of Executions |
|---|---|---|---|
| CORE 1 | 5 | N | 2 |
| CORE 2 | 10 | N | 0 |
| CORE 3 | 1 | Y | 151 |
| . | . | . | . |
| . | . | . | . |
| . | . | . | . |
| CORE N | 7 | N | 87 |

FIG. 4

|  | Application Reliability Requirement | Maximum Number of Executions |
|---|---|---|
| APPLICATION 1 | 2 | 10 |
| APPLICATION 2 | 1 | 999 |
| APPLICATION 3 | 5 | 3 |
| . | . | . |
| . | . | . |
| . | . | . |
| APPLICATION N | 7 | 1 |

FIG. 5

METHOD AND APPARATUS FOR DISABLING A PROCESSOR CORE BASED ON A NUMBER OF EXECUTIONS OF AN APPLICATION EXCEEDING A THRESHOLD

BACKGROUND

A multi-core platform includes two or more processor cores. Such a platform may assign applications to its processor cores based on any number of conventional algorithms. Over time, as the platform is used, each processor core may age or wear differently, resulting in differences in reliability among the processor cores of the platform.

The above-described degradation may result in processor cores that are unsuitable for executing mission-critical applications. Moreover, a mission-critical application that requires a specific level of processor core reliability may be assigned to a processor core that may become unreliable while executing the mission-critical application.

BRIEF DESCRIPTION OF THE DRAWINGS

FIG. 2 comprises a flow diagram of a process according to some embodiments.

FIG. 4 is a tabular representation of a portion of a database according to some embodiments.

FIG. 5 is a tabular representation of a portion of a database according to some embodiments.

DETAILED DESCRIPTION

Figure 1:
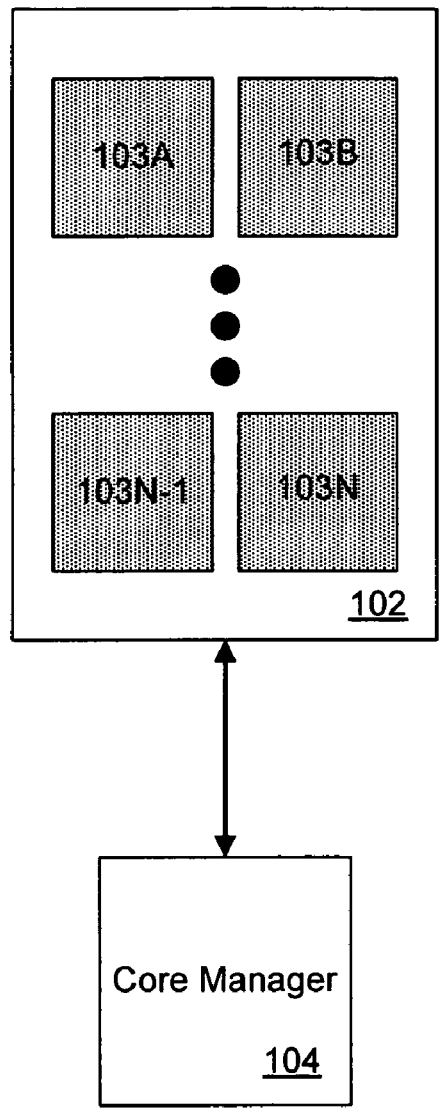
FIG. 1 illustrates an apparatus according to some embodiments.

Referring to FIG. 1, an embodiment of a system 100 is shown. The system 100 may comprise a processor die 102 and a core manager 104. The processor die 102 may include N number of processor cores 103A-103N. The system 100 may comprise any electronic system, including, but not limited to, a desktop computer, a server, and a laptop computer. Moreover, the processor die 102 may comprise any integrated circuit die that is or becomes known. For purposes of the present description, each of the processor cores 103A through 103N comprise systems for executing program code. The program code may comprise one or more software applications. Each of the processor cores 103A through 103N may include or otherwise be associated with dedicated registers, stacks, queues, etc. that are used to execute program code and/or one or more of these elements may be shared there between. In some embodiments, the core manager 104 may receive data during an execution of an application by the processor core 103A. The data may indicate a potential fault associated with the processor core 103A, and may be received from a database, directly from the processor core 103A, or from another entity. The core manager 104 may also determine to disable the processor core 103A based on the data, and activate the processor core 103B to execute the application. The core manager 104 may be implemented using any suitable combination of hardware, software, and firmware. According to some embodiments, the core manager 104 comprises an operating system layer.

Now referring to FIG. 2, an embodiment of a process 200 is shown. The process 200 may be executed by any combination of hardware, software, and firmware, including but not limited to, the system 100 of FIG. 1. Some embodiments of the process 200 may improve reliability of application executions.

At 201, data is received during execution of an application by a first processor core. The data may include, but is not limited to, an indication of a potential fault associated with the first processor core. In some embodiments, the data may indicate a number of times that the first processor core has executed the application.

Next, at 202 a determination is made to disable the first processor core. In some embodiments, the determination may be based on a threshold number of executions associated with the application and on the aforementioned number of times that the first processor core has executed the application. According to some embodiments, the determination at 202 is based on a reliability requirement associated with the application. The reliability requirement may comprise an indication of processor core reliability that is required by the application.

A second processor core is activated to execute the application at 203. In some embodiments, activation of the second processor core may include at least one of setting a flag in a database indicating that the second processor core is activated, or assigning the application to the second processor core.

Figure 3:
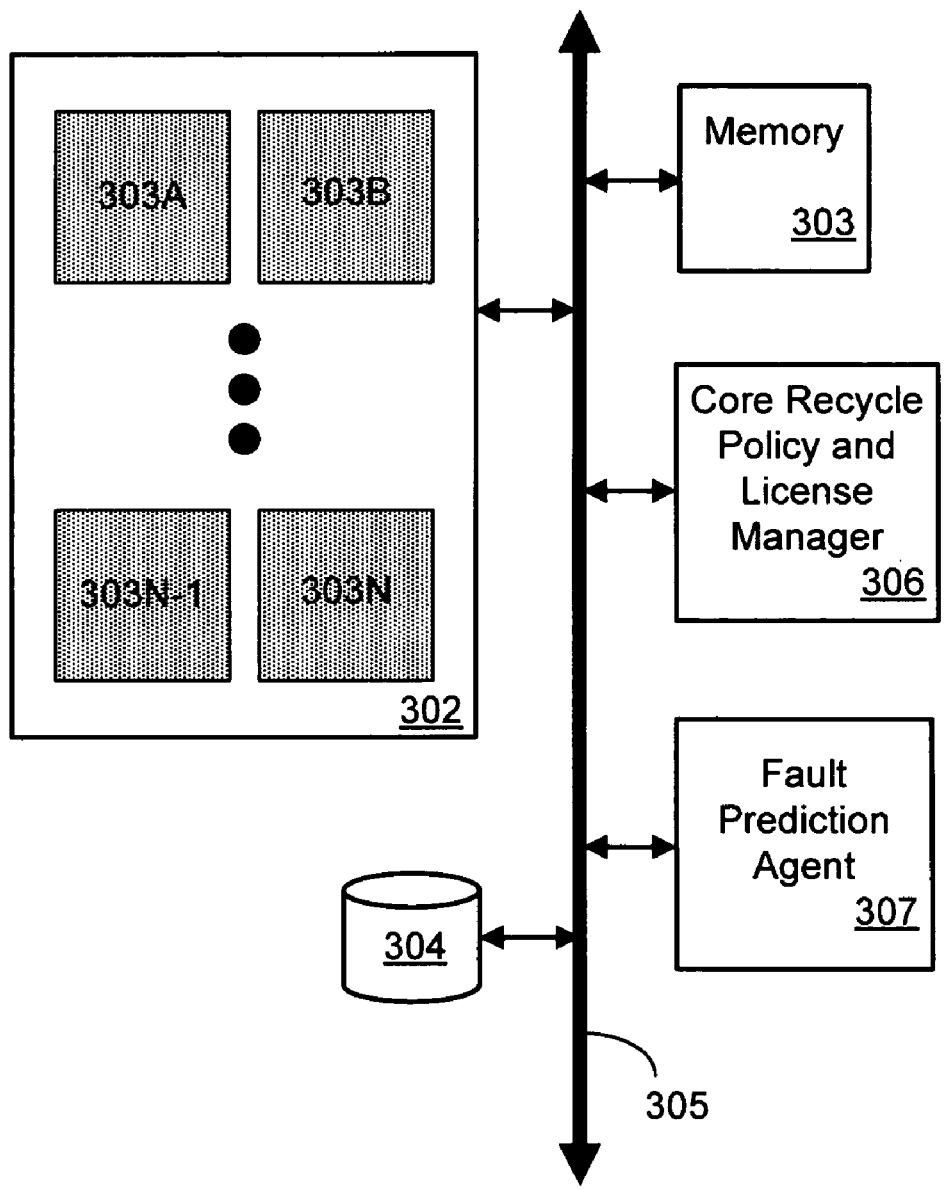
FIG. 3 illustrates a system according to some embodiments.

At FIG. 3, an embodiment of a system 300 is shown. The system 300 may implement the process 200 according to some embodiments. The system 300 may include processor die 302, a memory 303, a database 304, a bus 305, a core recycle policy and license manager 306, and a fault prediction agent 307. The processor die 302 may include N number of processor cores 303A-303N. In some embodiments, the processor die 302 may comprise more than one processor die. In another embodiment, the processor die may a logical grouping of processor cores located on more than one physical processor die.

The memory 303 may store, for example, applications, programs, procedures, and/or modules that store instructions to be executed. The memory 303 may comprise, according to some embodiments, any type of memory for storing data, such as a Single Data Rate Random Access Memory (SDR-RAM), a Double Data Rate Random Access Memory (DDR-RAM), or a Programmable Read Only Memory (PROM).

The fault prediction agent 307 may acquire data associated with each processor core 303A-303N. The acquired data may provide an indication of the reliability of each processor core 303A-303N, and/or an indication of a potential fault associated with each processor core 303A-303N. For example, the fault prediction agent 307 may acquire statistical information and core reliability metrics associated with each processor core 303A-303N. The fault prediction agent 307 may acquire the data from registers, such as, but not limited to a debug register and a model specific register. In some embodiments, the data may be acquired during a system reset. The data acquired by the fault prediction agent 307 may be used by the core recycle policy and license manager 306 as described below.

The database 304 may store data acquired by the fault prediction agent 307. The data may be used by the core recycle policy and license manager 306 to determine whether to activate or disable any of processor cores 303A-303N. The database 304, may be comprised of, but is not limited to, non-volatile memory, flash memory, magnetic media, optical media, read only memory, or any other available media.

The core recycle policy and license manager 306 may be implemented in hardware, software, or firmware. The core recycle policy and license manager 306 may implement the core manager 104 of the system 100. In some embodiments, the core recycle policy and license manager 306 may determine that a processor core is unsuitable for executing an application. Moreover, manager 306 may disable the unsuitable processor core and activate another processor core to execute the application.

FIG. 4 illustrates a tabular representation of a portion of a database. In some embodiments, the data of FIG. 4 is stored in database 304 and associates each of the processor cores 303A-303N with a reliability rank, an active flag, and a number of executions performed by the processor core 303A-303N. The reliability rank may reflect core reliability metrics acquired by the fault prediction agent 307. According to some embodiments, the reliability rank may comprise a function of one or more of a processor core component fault history, a degradation of the processor core measured by the number of hours of operation, a number of faults, frequency drift, and voltage and power susceptibility. The reliability rank may comprise a ranking of processor cores based on an individual processor core's probability of experiencing a fault. For example, a reliability rank of 0 may indicate that an associated processor core is the most unreliable processor core of the processor die 302 while a reliability rank of 10 may indicate that an associated processor core is the most reliable processor core.

In some embodiments, the active flag may indicate whether an associated processor core is active or disabled. The number of executions associated with a processor core in FIG. 4 may comprise a total number of application executions performed by the processor core.

FIG. 5 is a tabular representation of a portion of a database. FIG. 5 associates each of several applications with an application reliability requirement and a maximum number of executions. As mentioned above, the reliability requirement may comprise an indication of processor core reliability that is required by an application. The reliability requirement may be received from the application itself, from an operating system of the system 300, and/or via any other suitable mechanism.

The maximum number of executions may specify a number of times a processor core may execute a respective application before the processor core is disabled. The data of FIG. 4 and FIG. 5 may be represented by any alphanumeric character, symbol, or combination thereof and may be expressed in any suitable units. Examples of usage of the FIG. 4 and FIG. 5 data according to some embodiments will be provided below.

Figure 6:
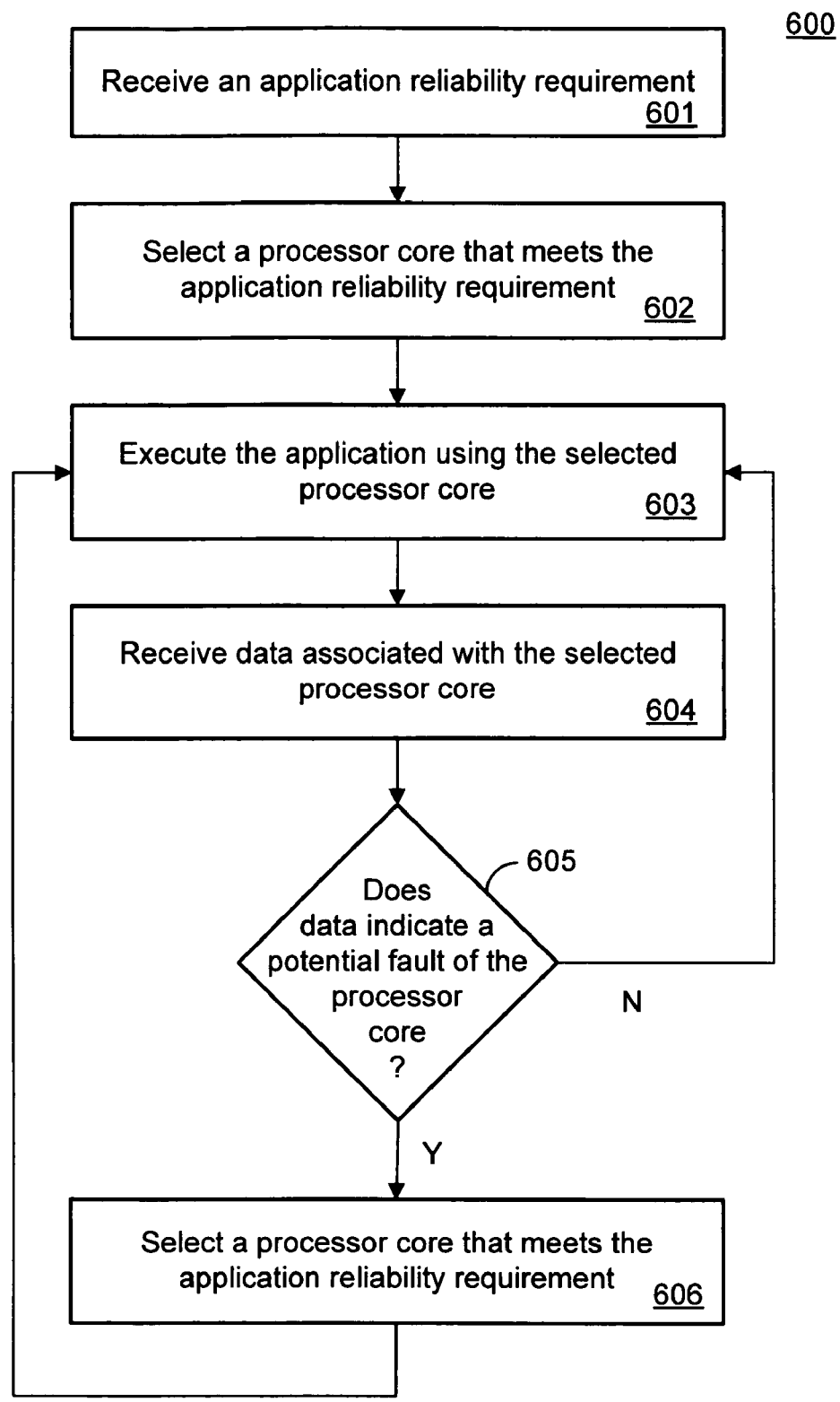
FIG. 6 comprises a flow diagram of a process according to some embodiments.

At FIG. 6, an embodiment of a process 600 is shown. The process 600 may be executed by any of the systems 100 and 300 described above, but embodiments are not limited thereto. Any platform including two or more processor cores may execute the process 600. Some embodiments of the process 600 may improve reliability of application executions.

At 601, an application reliability requirement is received. The application reliability requirement may be received at 601 from an application by the fault prediction agent 307. The fault prediction agent 307 may, in turn, store the received requirement in the database 304 as illustrated in FIG. 5.

For example, a mission-critical application, such as a heathcare-related application, may require a processor core associated with a high level of reliablity. This high level may be expressed in FIG. 5 as a high reliability rank and/or a low maximum number of executions. In another example, an application that is not mission-critical may be associated with an application reliability requirement that is expressed as a high maximum number of executions and/or a low reliability rank.

A processor core that meets the application reliability rank is selected at 602. For example, a processor core 303A-303N that satisfies or meets the application reliability requirement as described above may be selected for use with the application. For example, the core recycle policy and license manager 306 may select one of processor cores 303A-303N that meets the received reliability requirement based on the data of FIG. 4.

Next, at 603, the application is executed using the selected processor core. Data associated with the selected processor core is received at 604. The received data may indicate the potential of a fault to occur in the selected processor core. The data may be received by the fault prediction agent 307 automatically and/or in response to periodic or asynchronous requests from the fault prediction agent 307. The received data may be used to populate the database 304 as illustrated in FIG. 4. In this regard, the fault prediction agent 307 may process the data (e.g., determine a reliability rank based on the data) prior to populating the database 304.

At 605, it is determined whether the received data indicates a potential fault of the processor core. The determination at 605 is performed by the fault prediction agent 307 and/or the core recycle policy and license manager 306 according to some embodiments. The potential fault may be unrelated to the application reliability requirement, such as a complete malfunction of the selected processor core, or may be based on the application reliability requirement. In this regard, it may be determined that the data indicates a potential fault if the number of executions associated with the selected core becomes greater than a maximum number of executions associated with the application. Similarly, the data may be determined to indicate a potential fault if the reliability rank associated with the selected processor core becomes less than the application reliability requirement associated with the application.

Flow returns from 605 to 603 and cycles therebetween as long as the data received at 604 does not indicate a potential fault. Once the data is determined to indicate a potential fault, flow continues to 606 to select a new processor core that meets the application reliability requirement. Such a selection may proceed as described above with respect to 602. For example, in some embodiments, the selection is based on reliability ranks stored in the database 304. The selected processor core may or may not be associated with a highest reliability rank of a plurality of available cores.

The newly-selected processor core may be activated to execute the application at 603. In some embodiments, the core recycle policy and license manager 309 may activate the processor core by transferring a memory stack from the previously-used processor core to the newly-selected processor core. According to some embodiments of process 600, the originally-selected processor core is disabled after activation of the new processor core. Disabling the originally-selected processor core may comprise setting a flag associated with the processor core in the database 304 and/or by associating the processor core with a low reliability ranking in the database 304.

In some embodiments, the core recycle policy and license manager 306 may notify a processor core vendor that a processor core has been disabled and/or that a processor core has been activated. Such notification may occur automatically in response to either event, or may occur automatically at predetermined intervals if either event occurred during the previous interval. In some embodiments, the processor core vendor may be notified when the system 300 requires more processor cores 303A-303N or when a last available processor core 303A-303N is activated.

Various modifications and changes may be made to the foregoing embodiments without departing from the broader spirit and scope set forth in the appended claims.

What is claimed is:

1. A method comprising:
   receiving data during an execution of an application by a first processor core, wherein the data indicates a number of executions of the application performed by the first processor core;
   determining to disable the first processor core based on the data and on a determination that the number of executions of the application performed by the first processor core is greater than a maximum number of executions associated with the application; and
   activating a second processor core to execute the application based on the maximum number of executions associated with the application and on a number of executions already performed by the second processing core, wherein the number of executions of the application performed by the first processor core is greater than the number of executions already performed by the second processing core.

2. The method of claim 1, wherein activating the second processor core comprises:
   transferring a memory stack from the first processor core to the second processor core.

3. The method of claim 1, wherein determining to disable the first processor core further comprises:
   determining that the first core is unsuitable for executing the application based on the data.

4. The method of claim 1, further comprising disabling the first processor core.

5. The method of claim 4, wherein disabling the first processor core comprises at least one of:
   associating the first processor core with a disabled flag in a database; and
   associating the first processor core with a low reliability ranking in the database.

6. The method of claim 4, wherein activating the second processor core comprises:
   automatically notifying a processor core vendor that the first processor core is disabled and the second processor core is activated.

7. An apparatus comprising:
   a multi-core processor including a first processor core and a second processor core; and
   a core manager to:
   receive data during an execution of an application by the first processor core, wherein the data indicates a number of executions of the application performed by the first processor core;
   determine to disable the first processor core based on the data and on a determination that the number of executions of the application performed by the first processor core is greater than a maximum number of executions associated with the application; and
   activate the second processor core to execute the application based on the maximum number of executions associated with the application and on a number of executions already performed by the second processing core, wherein the number of executions of the application performed by the first processor core is greater than the number of executions already performed by the second processing core.

8. The apparatus of claim 7, wherein the determination to disable the first processor core comprises a determination that the first core is unsuitable for executing the application based on the data.

9. The apparatus of claim 7, wherein activation of the second processor core comprises:
   a determination of the second processor core from a plurality of available processor cores based on a plurality of reliability rankings associated with the plurality of available processor cores.

10. The apparatus of claim 9, wherein the second processor core is not associated with a highest reliability ranking of the plurality of reliability rankings.

11. The apparatus of claim 7, wherein the core manager is to disable the first processor core.

12. The apparatus of claim 11, wherein disabling the first processor core comprises at least one of:
    associating the first processor core with a disabled flag in a database; and
    associating the first processor core with a low reliability ranking in the database.

13. The apparatus of claim 11, wherein activation of the second processor core comprises:
    automatic notification of a processor core vendor that the first processor core is disabled and the second processor core is activated.

14. A system, comprising:
    a multi-core processor having a first processor core and a second processor core;
    a double data rate memory;
    and a core manager to:
    receive data during an execution of an application by the first processor core, wherein the data indicates a number of executions of the application performed by the first processor core;
    determine to disable the first processor core based on the data and on a determination that the number of executions of the application performed by the first processor core is greater than a maximum number of executions associated with the application,
    activate the second processor core to execute the application based on the maximum number of executions associated with the application and on a number of executions already performed by the second processing core, wherein the number of executions of the application performed by the first processor core is greater than the number of executions already performed by the second processing core.

15. The system of claim 14, wherein the core manager is to disable the first processor core.

16. The system of claim 14, wherein activation of the second processor core comprises:
    automatic notification of a processor core vendor that the first processor core is disabled and the second processor core is activated.

* * * * *